United States Patent [19]

Nagase

[11] Patent Number: 4,630,147
[45] Date of Patent: Dec. 16, 1986

[54] MAGNETIC HEAD POSITION DETERMINING MECHANISM

[75] Inventor: Yasuo Nagase, Tokyo, Japan

[73] Assignee: Anritsu Electric Company Limited, Tokyo, Japan

[21] Appl. No.: 537,302

[22] Filed: Sep. 29, 1983

[30] Foreign Application Priority Data

Nov. 16, 1982 [JP] Japan .................................. 57-199790

[51] Int. Cl.⁴ ........................ G11B 21/08; G11B 5/55
[52] U.S. Cl. ......................................... 360/78; 360/106
[58] Field of Search ................. 360/78, 104, 105, 106, 360/109, 75

[56] References Cited

U.S. PATENT DOCUMENTS

| | | | |
|---|---|---|---|
| 3,839,737 | 10/1974 | Vogel | 360/106 |
| 3,983,579 | 9/1976 | Nishinakagawa | 360/78 |
| 4,144,549 | 3/1979 | Burdorf et al. | 360/78 |
| 4,198,544 | 4/1980 | Buglewicz | 360/78 |
| 4,275,427 | 6/1981 | Bjordahl | 360/106 |

FOREIGN PATENT DOCUMENTS 2431545 2/1975 Fed. Rep. of Germany ........ 360/78

Primary Examiner—Aristotelis M. Psitos
Assistant Examiner—Steven R. Garland
Attorney, Agent, or Firm—Jordan and Hamburg

[57] ABSTRACT

A position determining mechanism for a magnetic head utilizes a plurality of steps of varying thickness formed on a rotatable disk to set the position of a magnetic head, e.g. in relation to tracks of a magnetic tape. Steps of the disk are selectively positioned between a member attached to the magnetic head and a fixed position reference surface, with the disk being normally held pressed between the magnetic head mounting member and the reference surface by a spring and being made free to rotate when the magnetic head mounting member is pulled apart from the position reference surface by a solenoid, to enable the disk to be rotated to select a step of different thickness for determining a different position of the magnetic head.

2 Claims, 8 Drawing Figures

MAGNETIC HEAD POSITION DETERMINING MECHANISM

BACKGROUND OF THE INVENTION

There are various applications in which it is necessary to move a specific member very rapidly and with a high degree of precision into a selected one of a number of different predetermined positions, i.e. to perform stepping of that member. Such positioning is required, for example, for the magnetic head of a multi-track magnetic tape recorder or a magnetic disk drive unit, such as are widely used in the data processing fields. This positioning is carried out in order to align a part of the magnetic head with a desired track of the magnetic medium. In the prior art, such stepping positioning has been performed by means of a motor, which drives the member to be positioned through coupling means such as a cam or drive screw. With such prior art stepping means, since track positions on the magnetic medium are selected by directly driving the magnetic head from a motor, then in order to attain the necessary high degree of precision in positioning the magnetic head, this motor must have a substantially higher drive power capability than is necessary simply to move the magnetic head and furthermore in the case of a stepping motor being employed, it must generally also have a high degree of shaft positioning accuracy. Thus, the motor of such a prior art position determining mechanism for a magnetic head must be relatively large and heavy, and due to the positioning accuracy requirement it must also be relatively expensive. This has been a considerable obstacle hitherto in efforts to make such a position determining mechanism for a magnetic head more compact, lightweight and inexpensive than has been possible in the prior art.

The present invention has the objective of overcoming the problems of the prior art described above. With a position determining mechanism for a magnetic head according to the present invention, positioning of a magnetic head is performed by using a stepped disk, i.e. a disk having a plurality of steps of different thickness formed thereon, with the disk being coupled to the magnetic head in such a way that the current position of the magnetic head is determined by the thickness of a corresponding one of these steps on the disk, previously selected by rotation of the disk, as described hereinafter. With such a method, the positioning accuracy of the magnetic head is determined solely by the dimensional accuracy of the steps on the disk, i.e. the accuracy of the thickness of each of these steps. The motor which rotates the stepped disk does not directly move the magnetic head itself, so that this motor can be small and light in weight, with low power consumption. In addition, the stepping accuracy required for this motor is extremely low, so that a simple and inexpensive motor can be employed, thereby substantially reducing the overall cost of a position determining mechanism for a magnetic head according to the present invention by comparison with the prior art.

SUMMARY OF THE INVENTION

A position determining mechanism for a magnetic head according to the present invention basically comprises a movable magnetic head assembly having a magnetic head fixedly mounted thereon, the magnetic head assembly being urged by pressure application means such as a spring towards a reference surface of a position reference member, the latter being fixedly disposed with respect to the magnetic head assembly, e.g. being fixed to or formed on a frame of the mechanism. A stepped disk having a plurality of steps of different thickness (as measured in a direction parallel to the axis of rotation of the disk) formed thereon is rotatably mounted such that one of these steps is normally held pressed between the pressure application means and the reference surface, to thereby define the position of the magnetic head. First actuation means such as a solenoid are provided, coupled to the magnetic head assembly, activatable for drawing the magnetic head assembly away from the stepped disk to thereby allow free rotation of the stepped disk. Second actuation means such as a stepping motor are coupled to the stepped disk and are activatable, while the first actuation means are activated to permit free rotation of the stepped disk, to rotate the stepped disk into a position whereby a step of such thickness as to provide a desired position of the magnetic head becomes positioned between the magnetic head assembly and the reference surface of the position reference member. After this rotation is completed, the first actuation means are deactivated, whereby the pressure application means act to press the newly selected step of the stepped disk between the magnetic head assembly and the reference surface, to thereby define a corresponding position of the magnetic head.

The above will be made cleared by the following description of the preferred embodiments.

DESCRIPTION OF THE PREFERRED EMBODIMENTS

Figure 1C:
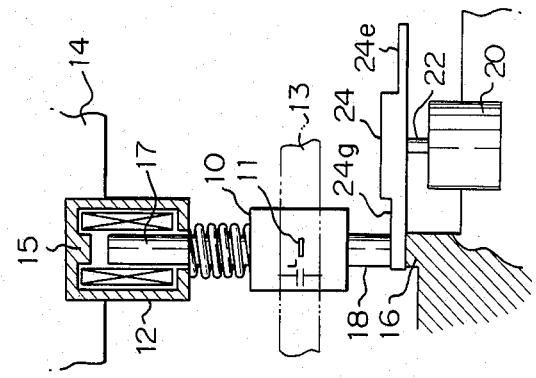
FIG. 1(A) to 1(C) show a first embodiment of a position determining mechanism for a magnetic head according to the present invention, in partial cross-sectional view.
Figure 1B:
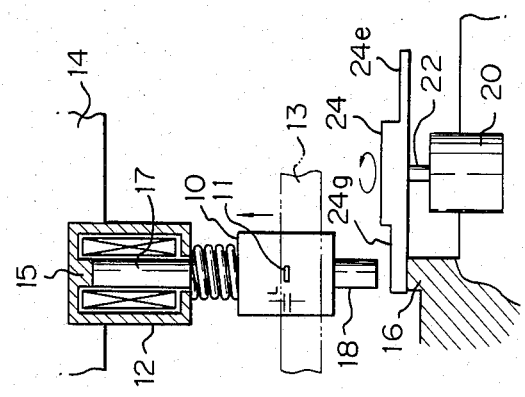
Figure 1A:
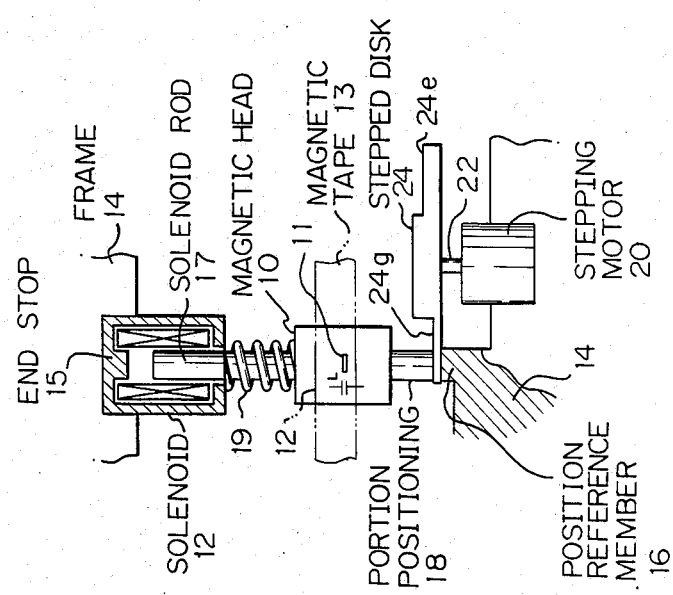

FIG. 1(A) to 1(C) are partial views in cross-section of a first embodiment of a position determining mechanism for a magnetic head according to the present invention. In these diagrams, 16 denotes a position reference member, which in this embodiment is formed of a part of the supporting frame 14 of the mechanism, with a surface thereof serving as a position reference as described hereinafter. Numeral 10 denotes a magnetic head, provided with a core portion 11 which is selectively set in positions corresponding to each of a plurality of tracks of a magnetic tape 13. Numeral 12 denotes first actuation means comprising a solenoid, fixedly mounted on frame 14, and provided with an end stop portion 15 as shown. The magnetic head 10 is fixedly mounted on a magnetic head assembly 12, which in this embodiment comprises a solenoid rod 17 formed of a magnetically permeable material and a positioning portion 18 disposed at the opposite end of a magnetic head assembly 12 from solenoid rod 17, i.e. with magnetic head 10 being disposed between solenoid rod 17 and positioning portion 18. The magnetic head assembly 12 is further provided with pressure application means which in this embodiment comprise a coil spring 19 mounted on solenoid rod 17 between solenoid 12 and magnetic head 10 such as to urge magnetic head 10 towards position reference member 16. The solenoid rod 17 is received within solenoid 12 a shown, and is pulled into solenoid 12 when the latter is energized, against the force exerted by coil spring 19, until the tip of solenoid rod 17 comes into contact with end stop portion 15. Numeral 20 denotes a stepping motor mounted on frame 14 and having a drive shaft 22 coupled to rotate a stepped disk 24. A plurality of steps of different thickness are formed on stepped disk 24, as described hereinafter. Normally, stepped disk 24 is held in a stationary condition with one of these steps (in the example of FIG. 1(A), step 24g) held pressed between the end face of positioning portion 18 and the reference surface of position reference member 16 by the urging action of coil spring 19. The plane of rotation of stepped disk 24 is parallel to the direction of movement of magnetic tape 13.

Figure 2:
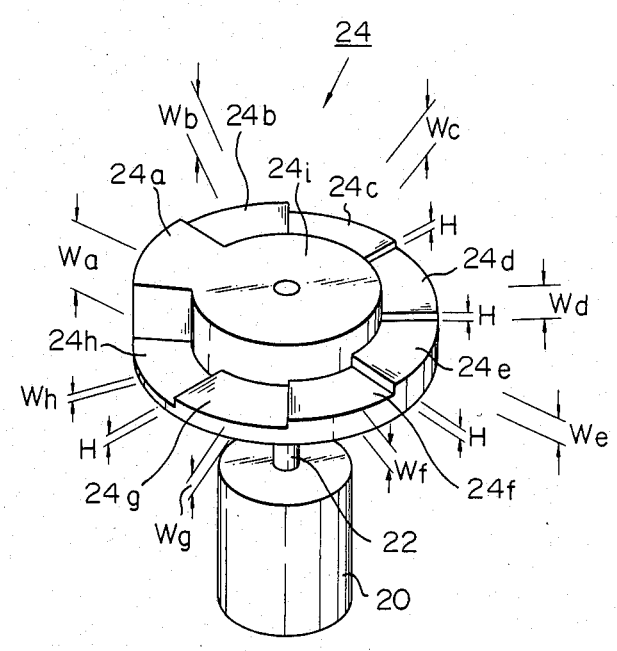
FIG. 2 is an oblique view of a stepped disk used in the embodiment of FIG. 1(A) to 1(C)
Figure 3:
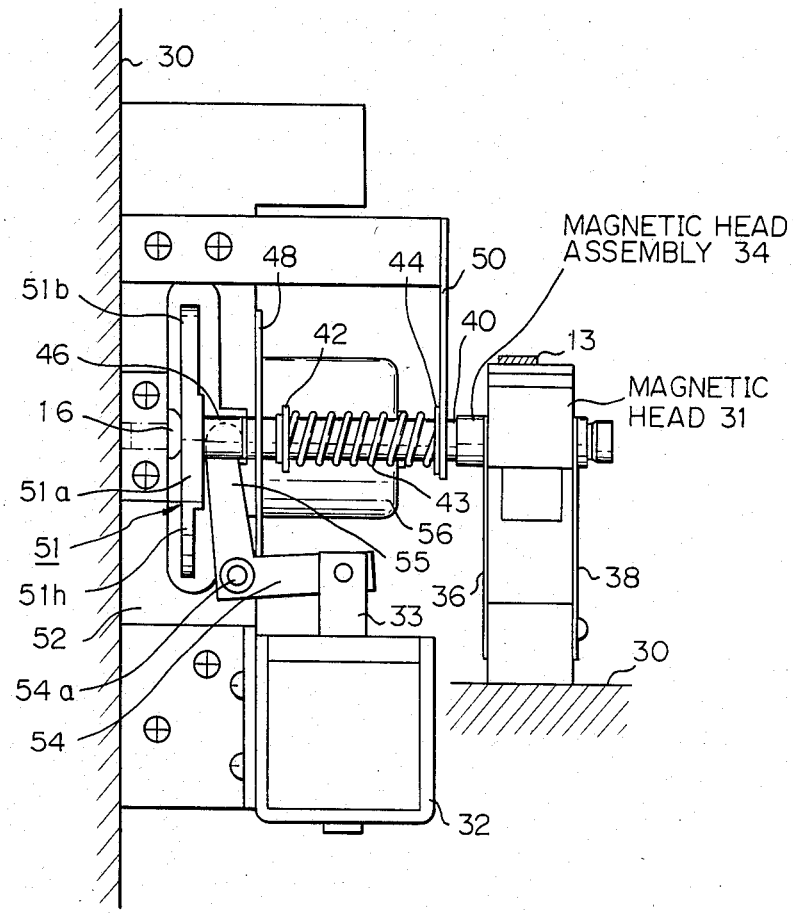
FIG. 3 is a view in elevation of a second embodiment of a position determining mechanism according to the present invention.
Figure 4:
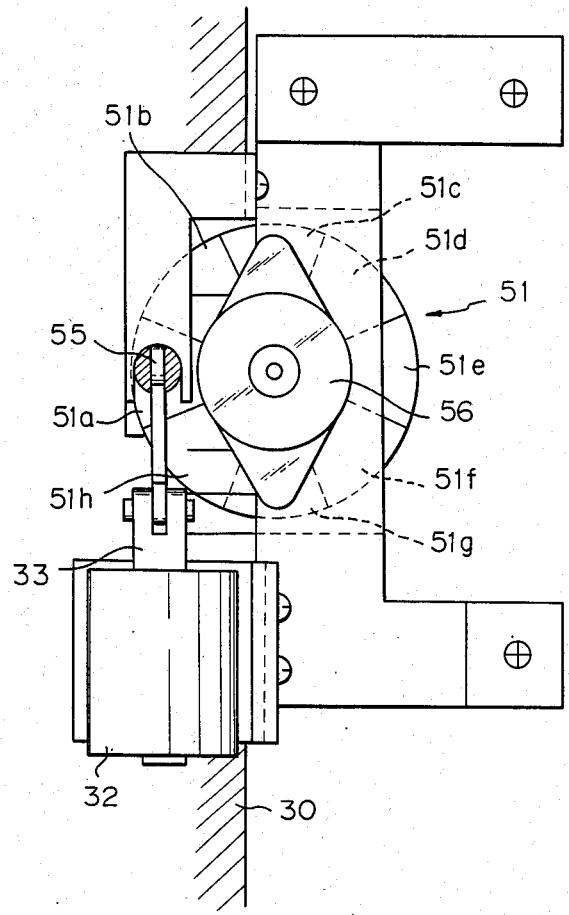
FIG. 4 is a view in elevation of the embodiment of FIG. 3, taken at right angles thereto.
Figure 5:
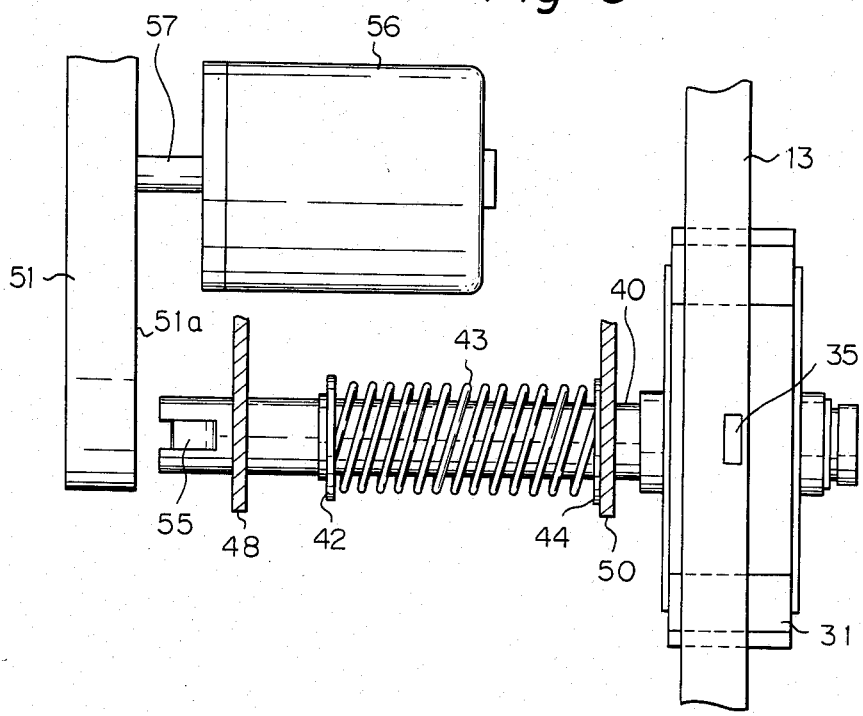
FIG. 5 is an expanded view in plan of a part of the embodiment of FIG. 3.

FIG. 2 is an oblique view of stepped disk 24 and stepping motor 20 of the embodiment of FIG. 1(A). As shown, stepped disk 24 is formed with 8 steps, designated as 24a to 24h, having successively varying thickness and arranged around the peripheral area of disk 7. The drive shaft 22 of stepping motor 20 is fixedly mounted within a central aperture in stepped disk 24. There is a fixed difference H between the thickness of successive ones of steps 24a to 24h of stepped disk 24, with the thicknesses of these steps being designated as Wa to Wh respectively. This step difference H is identical to the track width of magnetic tape 13, i.e. to the distance by which magnetic head 10 must be moved along the axis of magnetic head assembly 12 in order to move from a position above a particular track of magnetic tape 5 to a position immediately above an adjacent track. This distance will be assumed to be identical to the width of core portion 11 of magnetic head 10, which generates or senses magnetic flux in order to write data to or read data from magnetic tape 13. In this embodiment, disk 7 is provided with 8 steps, i.e. is suitable for an 8-track magnetic tape.

The operation of this embodiment will now be described. It will be assumed that magnetic head 10 is to be moved from the position shown in FIG. 1(A) to a different position, i.e. core portion 11 is to be repositioned at a different track of magnetic tape 13. First, solenoid 12 is energized, thereby producing a magnetic field which exerts a force to draw solenoid rod 17 into solenoid 12, with this force being sufficient to overcome the urging force produced by coil spring 19. As a result, magnetic head assembly 12 is moved away from stepped disk 24 in a direction along the longitudinal axis of magnetic head assembly 12, with this movement being continued until the tip of solenoid rod 17 contacts end stop portion 15 of solenoid 2. The resultant condition is shown in FIG. 1(B). The amplitude of the movement of magnetic head assembly 12 is sufficient that the tip of positioning portion 18 is separated from the largest step (i.e. step 24a, of thickness Wa, shown in FIG. 2), so that stepped disk 24 is now free to rotate.

Next, with solenoid 12 remaining in the energized state, stepping motor 20 is set into stepping operation, whereby stepped disk 24 is rotated into a position such that a specific one of steps 24a to 24h (in the example of FIG. 1(B), step 24e), is positioned between postioning portion 18 and position reference member 16, with this step thickness corresponding to the position of a new track of magnetic tape 13 which is to be selected. The solenoid 12 is then de-energized, whereby magnetic head assembly 12 is pressed by the urging action of coil spring 19 against the selected one of steps 24a to 24h, i.e. in this example step 24g. The resulting condition is shown in FIG. 1(C). As can be seen, positioning of magnetic head 10 has been completed, with core portion 11 of magnetic head 10 having been set at a position corresponding to the newly selected track of magnetic tape 13. Write-in or read-out of data to or from magnetic tape 13 can now be carried out. When this has been completed for the selected track and a new track has to be selected, then the sequence of operations described above is repeated, such as to position a different one of steps 24a to 24h between positioning portion 18 of magnetic head assembly 12 and position reference member 16.

It can thus be understood that by successively repeating the sequence of operations described above, successively from step 24a to step 24h of stepped disk 24, core portion 24a of magnetic head 10 will be successively stepped over each of the tracks of magnetic tape 13, moving in a direction from solenoid 12 towards position reference member 16. Conversely, if stepped disk 24 is stepped successively from step 24h to step 24a, then core portion 11 will successively move in a direction from position reference member 16 towards solenoid 12, i.e. will move across successive tracks of magnetic tape 13.

Upon the completion of a stepping operation to position magnetic head 10, the solenoid 12 and stepping motor 20 are both left in a de-energized state, so that the condition shown in FIG. 1(C) will be maintained.

In this embodiment, stepped disk 24 is provided with 8 steps, but of course this is not a limiting number of steps, and in general the number of steps will be equal to the number of tracks of the magnetic medium which have to be selected.

A second embodiment of the present invention will now be described, with reference to FIG. 3 to FIG. 6. Numeral 34 denotes a magnetic head assembly which is movably supported on frame 30 by leaf springs 36 and 38, and comprises a magnetic head 31 and an actuating rod 40. The magnetic head assembly 34 moves in a direction at right angles to the direction of movement of magnetic tape 13. Actuating rod 40 is provided with a fixed collar 42 and a movable collar 44 mounted thereon, with a coil spring 43 being mounted on actuating rod 40 between collars 42 and 44. In addition, actuating rod 40 is slidably mounted in supporting plates 48 and 50 which are attached to frame 30. Fixed and movable collars 42 and 44 are positioned between supporting plates 48 and 50.

First actuation means comprising a solenoid 32, and second actuation means comprising a stepping motor 56 are fixed to frame 30. The drive shaft 106a of stepping motor 56 has a stepped disk 51 fixedly mounted thereon, as in the case of the first embodiment. This stepped disk 51 is similar to that of the first embodiment, being provided with steps 51a to 51h having successively decreasing thickness, and these are selectively rotated into position between a position reference member 16 and the end face of the tip portion 46 of actuating rod 40.

Figure 6:
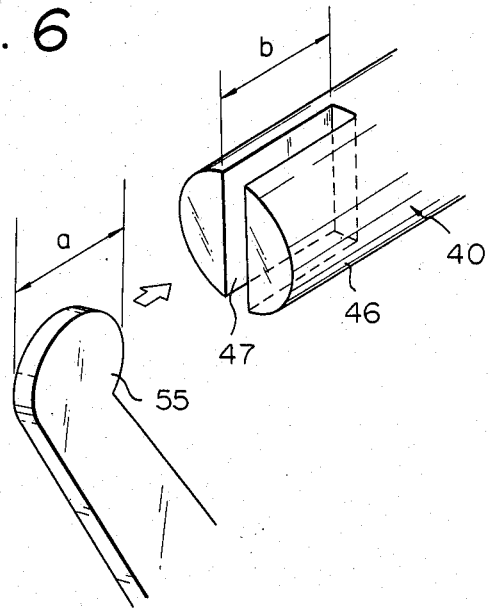
FIG. 6 is a partial oblique view illustrating means for coupling to an actuating rod in the embodiment of FIG. 3.

An L-shaped crank lever 54 is rotatably mounted on frame 30 by bearing means 54a provided at a central portion of lever 54. One end of lever 54 is coupled to actuating rod 33 of solenoid 32, while the other end of lever 54 (designated as 55) is coupled to connecting means 47 provided in the tip portion 46 of actuating rod 40. In this embodiment, the connecting means 47 comprise simply a slot formed in portion 46 of actuating rod 40, as shown in FIG. 6, although more complex connecting means can of course be implemented. The length b of the slot is greater than width a of lever end 55.

The operations whereby stepped disk 51 is rotated into a new position to select a new position for magnetic head 31 will now be described. First, solenoid 32 is energized, lever 54 is rotated in the clockwise direction (as viewed in FIG. 3), thereby moving magnetic head assembly 34 and hence magnetic head 31 against the force exerted by coil spring 43 and leaf springs 36, 38, such that actuating rod 40 is pulled apart from stepped disk 51 to an extent enabling free rotation of stepped disk 51. Next, with solenoid 32 still in the energized state, stepping operation of stepping motor 56 is carried out to rotate stepped disk 51 such as to bring a specific one of steps 51a to 51h (corresponding to a desired track position on magnetic tape 13) into place between actuating rod 40 and position reference member 16. Solenoid 32 is then de-energized, so that magnetic head assembly 34 now presses the selected step of stepped disk 51 against the position reference member 16, due to the force exerted by coil spring 43. Setting of the position of magnetic head 31 is thereby completed, with the core portion 35 of the head positioned at the selected track of magnetic tape 13, as determined by the selected step of stepped disk 51.

In both the first and second embodiments of a position determining mechanism for a magnetic head according to the present invention described above, it will be clear that the precision of positioning the magnetic head with respect to the tracks on the magnetic tape will be determined solely by the thickness of the steps of the stepped disk, and is in no way related to the stepping accuracy of the stepping motor. This is a basic feature of the present invention, which very clearly distinguishes the present invention from prior art types of position determining mchanism for a magnetic head. It will be apparent that the stepping motor need only provide sufficient accuracy to ensure that at least some portion of a selected step will become positioned between the end of the magnetic head assembly and the position reference member, since this will ensure that the magnetic head is set correctly into a position corresponding to that step. Furthermore, since the stepped disk is completely disengaged from other parts of the mechanism, and hence completely free to move, when it is rotated by the stepping motor, the stepping motor need only exert sufficient torque to overcome the friction of the motor bearings. Thus, the stepping motor can be small, light in weight and (since there is no need for a high degree of positioning accuracy) inexpensive. This is an important advantage, since the motor of a conventional type of position determining mechanism for a magnetic head is generally large, heavy and costly. It will also be apparent that the overall mechanical configuration of a position determining mechanism for a magnetic head according to the present invention can be extremely simple, and so can be made compact and inexpensive to manufacture.

In the described embodiments, a stepping motor is used to position the stepped disk. However other means can be envisaged to perform this function, since as explained above, the degree of positioning accuracy required is not high.

Although a position determining mechanism for a magnetic head according to the present invention has been describe in the above with reference to a magnetic head for use with magnetic tape, the present invention is equally applicable to equipment using other forms of recording media such as magnetic disk drive units, and in general to a variety of applications in which a component such as a recording head must be selectively stepped among a number of different positions, with position changes being performed rapidly and with a high degree of accuracy.

It should further be noted that since the first and second actuation means are only energized while a change in the magnetic head position is taking place, i.e. during occasional time intervals of brief duration, there is a reduced danger of stray magnetic flux from the position determining mechanism for a magnetic head interfering with the operation of the magnetic head, and in addition makes the amount of power reuqired to perform magnetic head positioning extremely low.

In addition, with a position determining mechanism for a magnetic head according to the present invention, since the magnetic head assembly directly contacts a face of the stepped disk to provide position determination, and is separated from the stepped disk while rotation of the disk is in progress, there is no relative sliding motion between the stepped disk and the magnetic head assembly. Thus, the rate of wear of the stepped disk (i.e. resulting in variations in the thickness of the steps over a long period of use) will be extremely low. This will make the amount of positioning error resulting from such wear extremely small, ensuring precise operation of such a mechanism over a long operating life.

It should also be noted that although in the described embodiments a magnetic head assembly carrying a magnetic head fixedly mounted thereon comes into direct contact with the stepped disk, it would be possible to envisage modifications of these embodiments whereby some intermediate coupling means such as a lever is disposed between the magnetic head assembly and the stepped disk. However the essential features of the present invention lie in the use of a stepped disk for positioning the magnetic head, and in means for making the stepped disk free to rotate when the magnetic head position is to be changed, together with means for rotating the stepped disk into an appropriate position. Such a modification would therefore not be a fundamental change in the structure.

Thus, although the present invention has been shown and described in the above with reference to specific embodiments, various changes and modifications to these embodiments may be envisaged, which fall within the scope claimed for the present invention as set out in the appended claims. The above specification should therefore be interpreted in a descriptive and not in a limiting sense.

What is claimed is:

1. A magnetic head position-determining mechanism comprising:
    a magnetic head position-determining reference member;
    a magnetic head assembly provided with a fixedly mounted magnetic head and a positioning portion, said positioning portion being superimposed and generally aligned with said reference member, said magnetic head assembly being movable in a direction toward and away from said reference member;

pressurizing means coupled to said magnetic head assembly to urge said magnetic head assembly toward said reference member;

a rotatably mounted stepped disk having a plurality of steps of different thicknesses with any one of said steps always disposed between said magnetic head assembly and said reference member such that when said magnetic head assembly moves in said direction toward said reference member, said positioning portion of said magnetic head assembly engages said stepped disk so that the latter is thereby pressure-engaged between said position portion and said reference member as said pressure means urges said magnetic head assembly toward said reference member;

first actuating means coupled to said magnetic head assembly to move said magnetic head assembly away from said reference member, thereby to separate said positioning portion from said stepped disk;

second actuating means to rotate said stepped disk during the operation of said first actuating means to such an extent as to set the predetermined step of said stepped disk between said positioning portion said said reference member; and control means for controlling said first and second actuating means for activating said first actuating means so as to remove said magnetic head assembly in said direction away from said reference member and out of contact with said stepped disk, for activating said second actuating means during said interim, thereby causing the designated step of said stepped disk to be disposed between said positioning portion and said reference member, and thereafter for de-activating said first actuating means, such that said pressurizing means moves said positioning portion into contact with the prescribed step of said stepped disk disposed between said positioning portion and said reference member.

2. The magnetic head positioning-determining mechanism according to claim 1, wherein said second actuating means is a stepping motor, said stepped disk is directed fitted to and supported by the drive shaft of said stepping motor.

* * * * *